US005772178A

United States Patent [19]
Bey

[11] Patent Number: 5,772,178
[45] Date of Patent: Jun. 30, 1998

[54] ROTARY NOISE ATTENUATING VALVE

[75] Inventor: Roger Bey, Illzach, France

[73] Assignee: Rotatrol AG, Cham, Switzerland

[21] Appl. No.: 577,924

[22] Filed: Dec. 22, 1995

[51] Int. Cl.$^6$ .................................................. F16L 55/207
[52] U.S. Cl. ........................... 251/127; 251/118; 138/42; 181/268
[58] Field of Search ........................... 137/625.3, 625.32; 251/118, 127; 138/42, 43; 181/254, 267, 268

[56] References Cited

U.S. PATENT DOCUMENTS

| | | |
|---|---|---|
| 1,615,564 | 1/1927 | Beery . |
| 3,170,483 | 2/1965 | Milroy ................................ 251/118 X |
| 3,630,229 | 12/1971 | Nagel et al. ......................... 251/118 X |
| 3,856,049 | 12/1974 | Scull ...................................... 138/43 X |
| 3,880,191 | 4/1975 | Baumann . |
| 4,085,774 | 4/1978 | Baumann ........................ 137/625.32 X |
| 4,271,866 | 6/1981 | Bey . |
| 4,295,493 | 10/1981 | Bey . |
| 4,402,485 | 9/1983 | Fagerlund ............................... 251/118 |
| 4,693,450 | 9/1987 | Paetzel .................................. 138/43 X |
| 4,738,283 | 4/1988 | Shirai et al. .................... 137/625.32 X |
| 4,973,406 | 11/1990 | Ponzielli ......................... 137/625.32 X |
| 5,070,909 | 12/1991 | Daverport . |
| 5,074,522 | 12/1991 | Reynolds etal. ................. 137/625.3 X |
| 5,287,889 | 2/1994 | Leinen .................................. 137/625.3 |
| 5,482,249 | 1/1996 | Schafboch et al. ...................... 251/118 |

FOREIGN PATENT DOCUMENTS

| | | |
|---|---|---|
| 0 621 428 | 10/1994 | European Pat. Off. . |
| 2712953 | 6/1995 | France . |
| 2810118 | 9/1979 | Germany ............................... 251/118 |
| 41 43 309 | 10/1992 | Germany . |
| 1283483 | 1/1987 | U.S.S.R. ............................... 251/118 |
| 9321 | of 1890 | United Kingdom .............. 137/625.32 |

OTHER PUBLICATIONS

One (1) page brochure—Drag 100 V/VS Control Valves Control Components Inc, date unknown.

*Primary Examiner*—John Rivell
*Attorney, Agent, or Firm*—Oblon, Spivak, McClelland, Maier & Neustadt, P.C.

[57] ABSTRACT

A rotary noise attenuating valve is provided which utilizes noise attenuation technology previously utilized with linear valves. The arrangement includes an impedance assembly in which the area with the impedance assembly which is accessed by the flow downstream of a rotary closure element flow is varied upon opening of the rotary closure element, with an interface assembly disposed between the rotary closure element and the impedance assembly. As a result, benefits previously realized only in linear valves are attainable utilizing a rotary valve, while the benefits attendant to rotary valves (such as greater capacity, variable Δp and/or minimum Δp under max flow) are also attainable.

26 Claims, 5 Drawing Sheets

FIG. 8
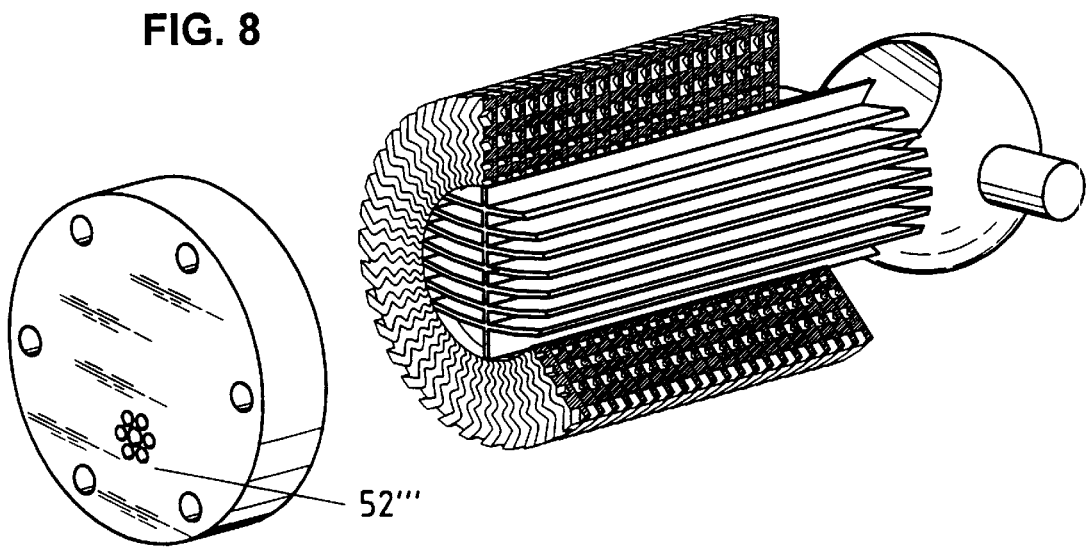
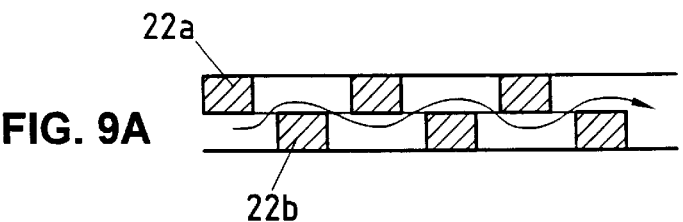
FIG. 9A
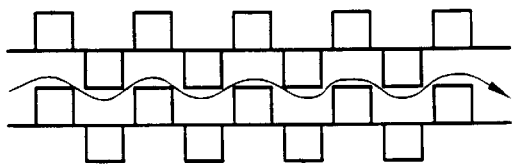
FIG. 9B

ROTARY NOISE ATTENUATING VALVE

BACKGROUND OF THE INVENTION

1. Field of the Invention

The invention relates to rotary noise attenuating valves, and particularly to a noise attenuating valve which includes an impedance assembly of the type previously limited to use with linear valves, with an interface or feeder assembly provided to allow the use of the impedance assembly with a rotary valve, such as a ball valve.

2. Discussion of Background

FIG. 1 shows a conventional linear valve assembly with a noise attenuation or impedance assembly. This valve is also known as a drag valve. As shown in FIG. 1, the linear valve includes an actuator assembly 10 for moving a piston 12. Disposed about the piston is an impedance assembly 14 which includes a plurality of passageways 16 extending therethrough. When the piston 12 is in the lowermost position, none of the passageways 16 is exposed to the incoming flow I. As the piston is opened (i.e., moved upwardly in the drawing figure) flow passes through the passageways 16 to provide an exit flow E, with the amount of flow varied by the position of the piston 12, which in turn varies the area or proportion of the impedance assembly which is exposed to the incoming flow.

The arrangement shown in FIG. 1 is particularly advantageous from a standpoint of reducing noise and, from a noise reduction standpoint, is superior to that available for rotary valves. However, the conventional arrangement is limited, for example, with regard to the size for which such an arrangement can be practically manufactured. For example, with piston diameters D larger than twelve inches, the arrangement is excessively expensive and can encounter instability problems.

SUMMARY OF THE INVENTION

The present invention overcomes shortcomings associated with the conventional linear impedance valve. In particular, the present invention provides an arrangement which retains the benefits of the impedance assembly associated with the linear valve, while utilizing a rotary closure element, such that the impedance assembly can be applied to larger, higher capacity valves.

In accordance with the present invention, a rotary closure element is provided, with the impedance assembly disposed at a downstream side of the closure element. A feeder or interface assembly is provided such that upon varying the degree of opening of the rotary closure element, the area within the impedance assembly which is exposed to the flow correspondingly increases. As a result, the benefits of the impedance assembly previously utilized with a linear valve are retained, and combined with the benefits associated with a rotary closure element such as a ball valve.

BRIEF DESCRIPTION OF THE DRAWINGS

A more complete appreciation of the invention and many of the attendant advantages thereof will be readily obtained as the same becomes better understood with reference to the following detailed description, particularly when considered in conjunction with the accompanying drawings, in which:

FIG. 8 is a perspective view of the FIG. 6 embodiment, with an optional baffle plate utilized as the cover plate for the impedance assembly; and FIGS. 9A and 9B depict arrangements which can be utilized for the resistor or baffle structure extending through the walls of the impedance assembly.

DESCRIPTION OF THE PREFERRED EMBODIMENTS

Figure 2:
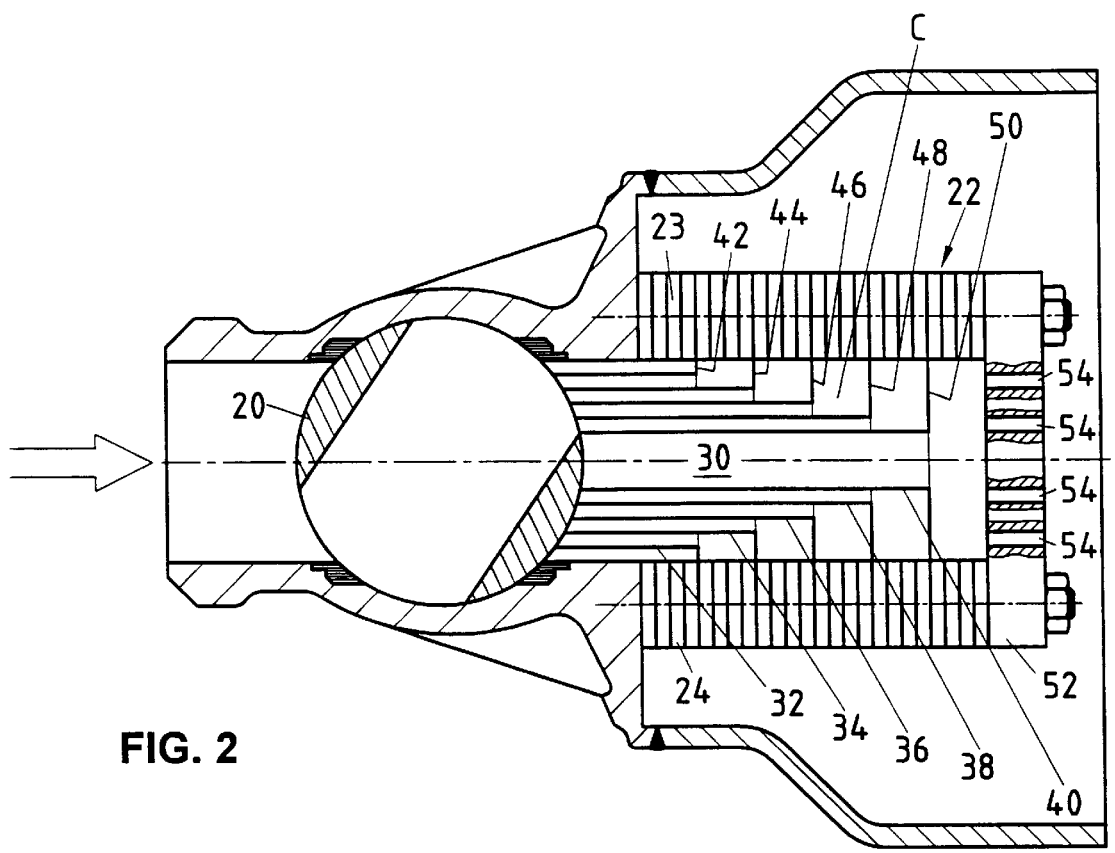
FIG. 2 is a cross-sectional view of a rotary noise attenuating valve of a first embodiment of the present invention.

Referring now to the drawings, wherein like reference numerals designate identical or corresponding parts throughout the several views, FIG. 2 is a side cross-sectional view of a first embodiment of the present invention. The valve assembly includes a rotary closure element such as a ball valve 20, which is shown in the partially open position. In addition, a resistor or impedance assembly is provided as shown at 22. The impedance assembly can be the same as that previously utilized with linear or piston type valves, and includes a wall 23 surrounding or delimiting a central cavity C, with a plurality of passageways 24 extending through the wall 23 to provide communication between the cavity C and the exterior of the impedance assembly 22. In accordance with the present invention, an interface or feeder assembly 30 is provided such that upon varying the opening of the ball valve 20, the area of the impedance assembly 22 which is exposed to the flow exiting from the ball valve 20 is correspondingly varied. In other words, as the amount of opening of the rotary closure element progressively increases, the area of the cavity and thus the number of passageways exposed to the flow also progressively increases.

In the embodiment shown in FIG. 2, the interface assembly 30 includes a plurality of channels ("channels" utilized herein to avoid confusion with the reference to the passageways of the impedance assembly), and the number of channels through which fluid flows increases as the closure element 20 is opened. Preferably, the portion of the interface assembly adjacent to the closure element will have a shape corresponding to the closure element (e.g., a spherical concave shape for a ball valve) so that access to the channels of the interface assembly is controlled, and the number of channels through which flow passes progressively increases as the closure element is progressively opened.

With the interface assembly 30 of FIG. 2, access of the fluid to the impedance assembly 22 is varied along a length direction of the impedance assembly (with the length direction extending from left to right in the drawing figure), such that when the closure element is initially opened, only the passageways 24 of the left portion of the impedance assembly are accessed by the fluid. As opening of the closure element progresses, the flow progresses along the length of the impedance assembly, thereby increasing the area of the inner wall of the impedance assembly (and thus the number of passageways) exposed to the flow. Thus, with regard to the flow of the fluid through the impedance assembly, the flow passes through the impedance assembly 22 in a manner similar to that of the linear or piston assembly discussed earlier with reference to FIG. 1, however the flow is controlled utilizing a rotary closure element such as a ball valve.

Figure 3:
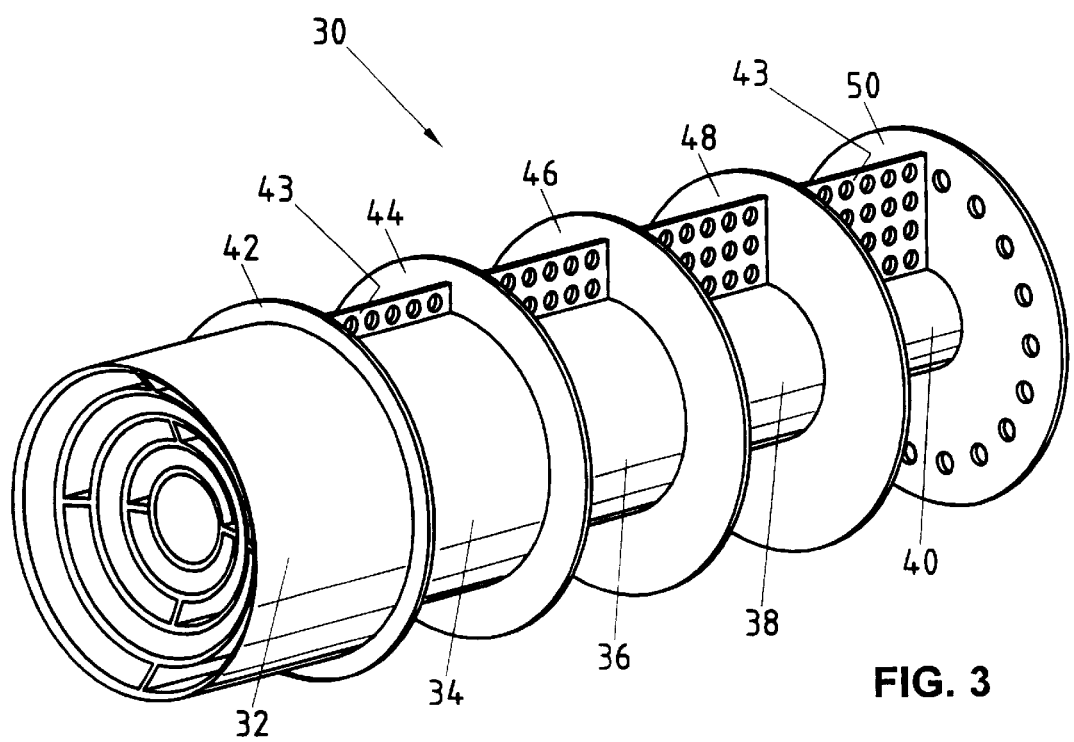
FIG. 3 is a perspective view of the feeder or interface assembly of the embodiment of FIG. 2.

Referring now to FIG. 3, the interface assembly of FIG. 2 will be described in further detail. As shown in FIG. 3, the interface assembly includes a plurality of nested tubular members 32, 34, 36, 38, 40, with the upstream-most tubular member having the largest diameter, but the shortest length. In addition, a plurality of end plates are provided as shown at 42, 44, 46, 48 and 50. When the closure element is initially cracked open, the flow will initially pass around the exterior of the first tubular portion 32, while the first end plate 42 prevents the flow from passing further in the length or axial direction of the impedance assembly, such that the flow will then pass only through the passageways 24 upstream of the plate 42. Thus, only a first length portion of the inner wall of the cavity is exposed to the flow.

Continued opening of the closure element 20 will result in the flow additionally passing between the tubular member 32 and the tubular member 34, with the end plate 44 preventing the flow from passing further in the axial direction within the cavity C, such that the flow passes from the cavity C through the impedance assembly 22 at only locations upstream of the plate 44. As the closure element 20 is progressively opened, the length of the impedance assembly 22 which is exposed to the flow increases, thereby increasing the number of passageways 24 which are exposed to the flow in the length direction of the impedance assembly.

Figure 1:
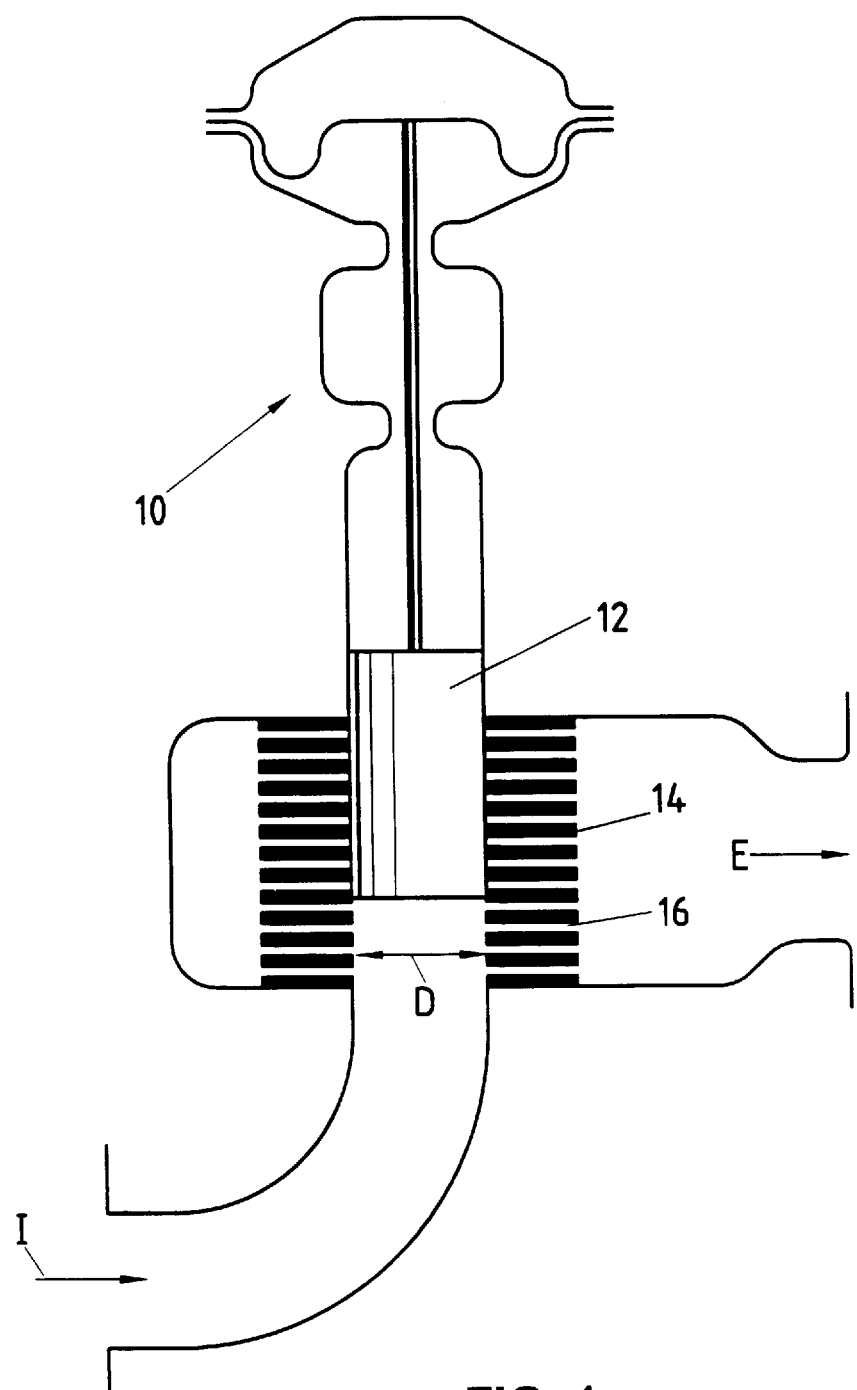
FIG. 1 depicts a conventional linear valve with noise attenuation.
Figure 4:
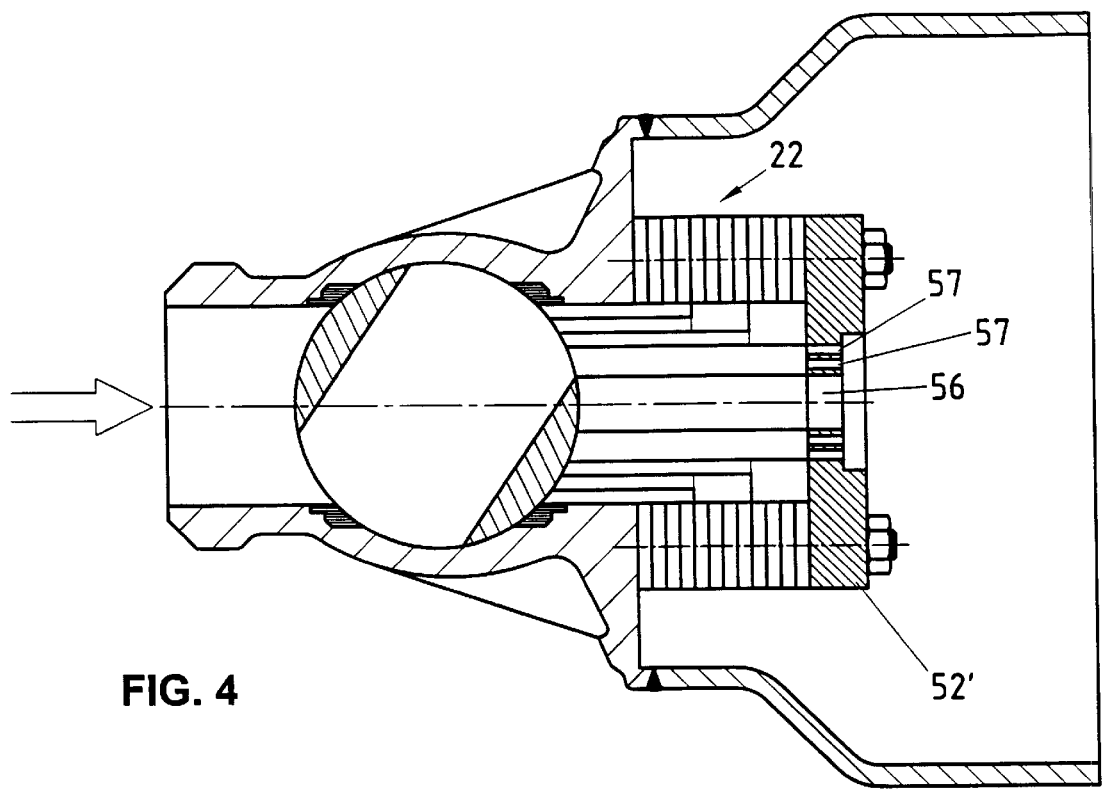
FIG. 4 is a cross-sectional view of the FIG. 2 embodiment, with a modified impedance end plate or cover plate closing an end of the impedance assembly.

At the downstream end of the impedance assembly, a cover plate 52 is provided (FIG. 1, "cover plate" utilized here to avoid confusion with the end plates previously described). The cover plate 52 can be completely closed, or can include perforations as shown at 54. Alternatively, as shown in FIG. 4, the cover plate 52' of the impedance assembly 22 can provide for a direct communication or direct flow from the closure element through the interface assembly to the downstream side of the interface assembly without passing through the wall (or walls) of the impedance assembly 22. In particular, as shown in FIG. 4, the cover plate 52' can include an opening 56 which allows for a more direct flow as the closure element moves toward the fully opened position, thereby providing for a larger maximum flow. Further, if desired, prior to or at the fully opened position, the cover plate 52' can provide an impeded flow, for example, by providing a perforate structure 57 associated with the channel or channels of the interface assembly accessed at, or prior to, the fully opened position. As should be readily apparent, in addition to retaining the benefits of the impedance assembly previously utilized in linear valves, the present invention further enhances the flexibility (i.e., structural variations possible) in using the impedance assembly beyond that possible with prior linear valves, since the piston of the linear valve blocked any flow through an axial end of the impedance assembly. With the present invention, the cover plate can provide a blocked (closed) end flow, an open end flow, or a perforate (baffle) impeded end flow. Thus, with the present invention it is possible to provide a stack feeder (or interface assembly) combined with a cover plate opening and/or baffle structure, which can be desirable for larger maximum flows, and for varying capabilities with regard to the desired pressure drop across the valve assembly for various applications. As in the FIG. 2 embodiment, with the arrangement shown in FIG. 4, when the valve is initially opened, the flow passes through only a portion of the walls of the impedance assembly 22, and as the closure element is progressively opened, the length of the impedance assembly 22 which is accessed by the flow increases.

Although tubular/cylindrical/disk configurations and shapes are shown for the interface and impedance assemblies of FIGS. 2–4, with the cavity C of the impedance assembly cylindrical, it is to be understood that other shapes are possible. In addition, while the channels defined by the interface assembly are depicted as symmetrical and concentric, off-center or eccentric arrangements are also possible.

Figure 5:
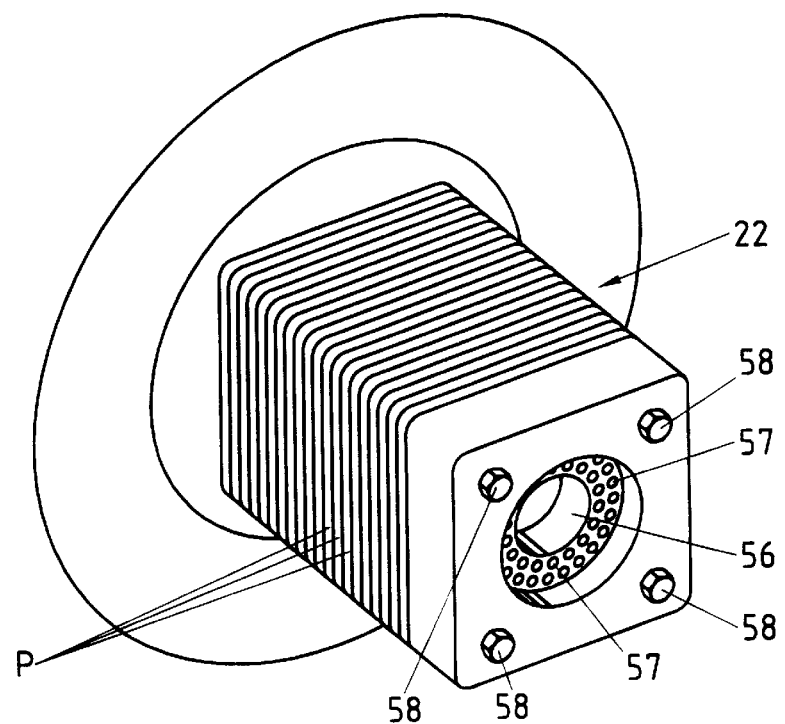
FIG. 5 is a perspective view of an example of an impedance portion which can be utilized in the valve assembly of the present invention.

FIG. 5 is a perspective view of a resistor package or impedance assembly having rectangular outer shapes and having a cover plate 52' as shown in FIG. 4. As shown in FIG. 5, an unobstructed or direct flow portion can be provided (by passageway 56) which directly communicates with the closure element (i.e., a portion of the flow passes through 56 without passing through the walls of 23 of the impedance assembly 22). In addition, baffles or perforations can be provided as shown at 57.

If desired, the open passageway 56 could be positioned at a lower portion of the interface assembly and impedance assembly. In addition, if desired the upper portions (i.e., upper with respect to FIGS. 2 and 4) of the impedance assembly can be isolated from the lower portions (e.g., by dividers extending along the interface assembly), so that the lower portions of the impedance assembly are not accessed until a greater amount of opening of the closure element is achieved. With this arrangement (utilizing dividers) combined with a lower direct opening passage in the cover plate, the direct flow portion is not encountered until after a greater degree of opening of the closure element as compared with the arrangements shown in FIGS. 2–4. More particularly, with the impedance assembly shown in FIGS. 2–4, dividers or spacers (e.g., as shown at 43 in FIG. 3) required for structural support and spacing of the tubular elements allow the flow to pass circumferentially therethrough, e.g., by utilizing perforate supports or other open structures. Thus, a length portion of the impedance assembly is exposed to the flow about the circumference or periphery of that length of the assembly at substantially the same time. However, non-perforated dividers or spaces could also be utilized and disposed at locations such that upper and lower regions of a particular length portion are accessed at different times.

As also shown in FIG. 5, the impedance assembly 22 can be formed of a plurality of plates P which are stacked and held together by bolts 58. Referring briefly to FIGS. 9A and 9B, examples of plate structures which provide the passageways or impedance structures of the impedance assembly 22 are depicted. As shown in FIG. 9A, the impedance assembly can be formed by plates 22a, 22b having apertures therethrough, with the apertures offset, such that the flow alternates between the plates as the flow passes through the passageways of the impedance assembly, i.e., from the internal cavity, through the walls 23 and outside of the impedance assembly 22. Alternately as shown in FIG. 9B, the plates can have a toothed or baffle structure providing a tortuous passageway through which the flow travels as it passes through the walls of the impedance assembly 22. Of course, the impedance assembly is not limited to these arrangements, and could also be formed of, e.g., a cast or machined structure (rather than plates) in which passageways are machined through the walls of the impedance assembly. Simpler passageways through the walls, such as a perforate structure or straight through holes, can be performed by conventional machining, while more complex structures could be formed by, e.g., electrical discharge machining.

Figure 6:
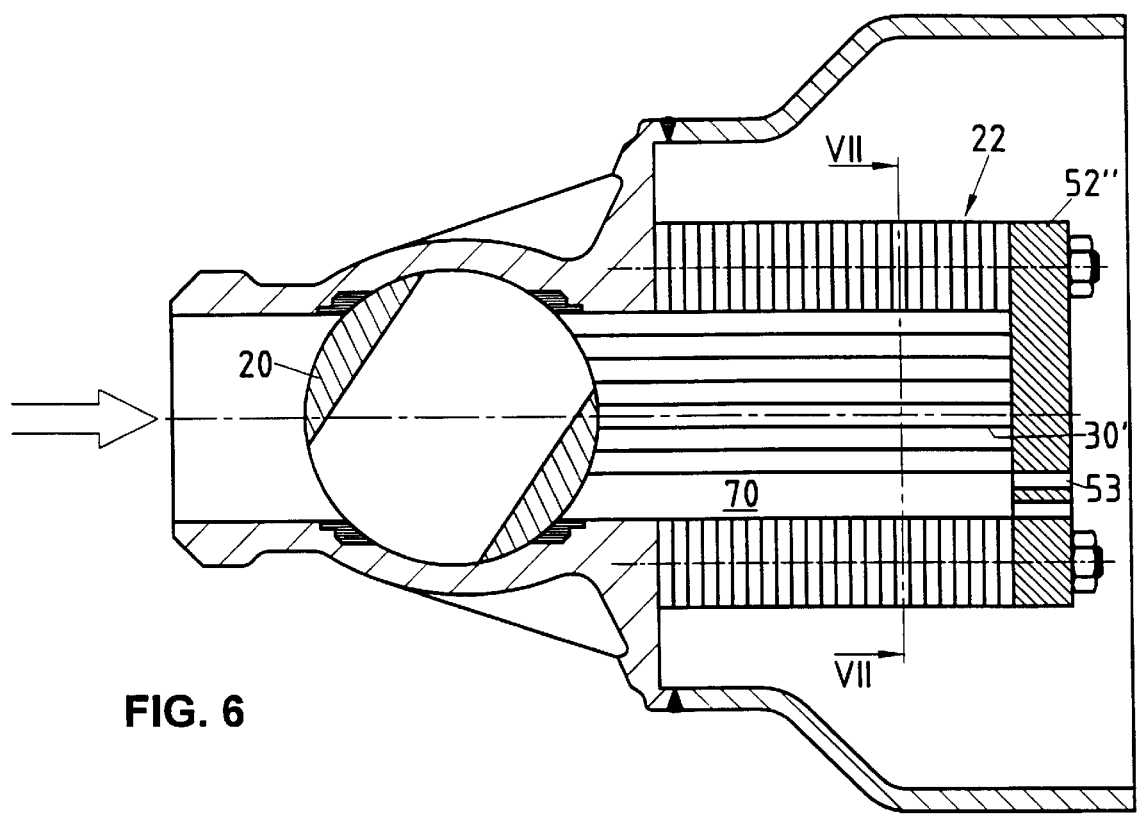
FIG. 6 is an alternate rotary noise attenuating valve of the present invention.
Figure 7:
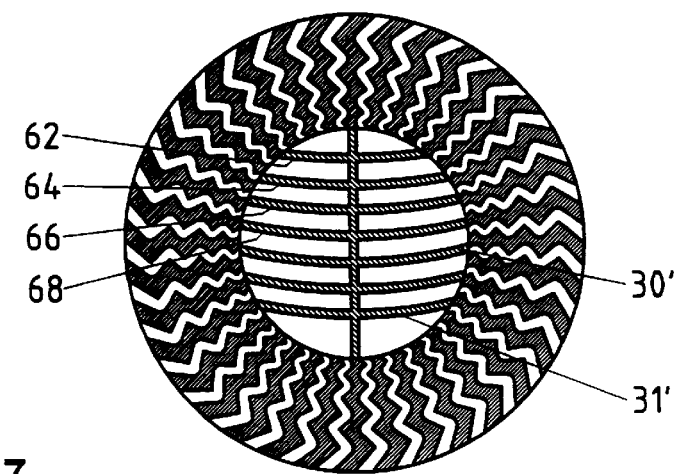
FIG. 7 is a sectional view along section VII—VII of the FIG. 6 embodiment.

Referring now to FIG. 6, an alternate embodiment of the present invention is shown. In the arrangement of FIG. 6, rather than varying the length of access to the impedance assembly as the closure element 20 is opened, the peripheral or circumferential access to the impedance assembly 22 is varied. In particular, as shown in FIG. 7, the impedance assembly 30' includes a plurality of dividers 62, 64, 66, etc. Each of the dividers 62, 64 . . . , restrict the flow to a peripheral portion of the impedance assembly 22, with the flow halted in the length or axial direction of the impedance assembly by the cover plate 52". With this embodiment, each of the channels of the interface assembly extend along the length of the impedance assembly, however the channels access different portions of the inner periphery of the walls 23 of the impedance assembly 24. As in the embodiment discussed earlier, the cover plate 52" can be fully closed, or may include an opening 53 or perforations, which allow flow to pass from the rotary closure element without passing through the walls of the impedance assembly 22. As the closure element 20 is initially opened, the flow will pass only above the first divider 62 of FIG. 7, such that the flow accesses only the inner peripheral portion of the impedance assembly 22 which is above the first divider 22. As the closure element continues opening, the portion of the inner periphery above the divider 64 will additionally be accessed, with continued opening successively then accessing the inner peripheral portions associated with the divider 66, 68, etc. Finally, in the full open position, the entire periphery of the impedance assembly is accessed and, if desired, an open portion of the cover plate 52" can be associated with one of the channels 70 (FIG. 6) when the closure element is in the full open position. Of course, if desired, a direct flow opening can be disposed in the cover plate at a location corresponding to a divider before the full open position, or a baffle structure can be associated with the cover plate. FIG. 8 is a perspective view of the arrangements shown in FIGS. 6 and 7. As discussed earlier, if desired, a baffle plate structure or perforated plate can be provided as the cover plate for the impedance assembly as shown at 52'''.

As should be readily apparent from the foregoing, the present invention provides a rotary valve assembly which allows the use of an impedance assembly previously utilized only in linear or piston type valves. Thus, the benefits of a linear impedance assembly are realized in the context of a rotary valve assembly (allowing for greater capacity, variable Δp and/or minimum Δp conditions with max flow). Further, the capabilities of the impedance assembly can be expanded beyond that utilized in linear valves, since the cover plate or axial end of the impedance assembly can also be modified as desired.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by letters Patent of the United States is:

1. A valve assembly comprising:
   (a) a rotary closure element; and
   (b) an impedance assembly disposed downstream of said rotary closure element, said impedance assembly including:
      (i) impedance means defining a plurality of passageways;
      (ii) interface means between said rotary closure element and said impedance means defining a plurality of passageways, said interface means for varying access to said plurality of passageways based upon positioning of said rotary closure element such that a number of passageways through which flow passes progressively increases during opening of said rotary closure element, said interface means including a plurality of channels;
   wherein said plurality of channels of said interface means each has an inlet adjacent a location of said rotary closure element to provide a plurality of inlets, and wherein at least a portion of said plurality of inlets collectively form a contour corresponding to a contour of an outer surface of said rotary closure element, each of said plurality of channels of said interface means further including an outlet disposed adjacent to said impedance means, wherein fluid flows in a portion of said interface means along a first direction, and further wherein fluid passes from said plurality of outlets and through said passageways of said impedance means in a direction substantially perpendicular to said first direction; and
   wherein at least a portion of said plurality of channels is defined by a plurality of walls extending in said first direction, and wherein said plurality of walls are non-perforated walls.

2. A valve assembly as recited in claim 1, wherein said impedance means includes a central cavity, and wherein said interface means is at least partially disposed within said central cavity.

3. A valve assembly as recited in claim 1, wherein said impedance means includes peripheral wall means, and wherein said plurality of passageways extend through said peripheral wall means, and further wherein said interface means is at least partially disposed inside of said peripheral wall means.

4. A valve assembly as recited in claim 3, wherein:
   said peripheral wall means includes a length extending in a first direction, and wherein said plurality of passageways are distributed along said first direction and about a peripheral direction; and
   wherein said interface means causes, as said rotary closure element is moved from a closed position to an open position, a number of passageways through which fluid flows to increase in at least one of said first direction and said peripheral direction.

5. A valve assembly as recited in claim 4, wherein said interface means includes means for causing the number of passageways in said first direction through which fluid flows to increase as said rotary closure element is opened.

6. A valve assembly as recited in claim 5, wherein said outlets are disposed at different locations along said first direction.

7. A valve assembly as recited in claim 1, wherein said outlets are distributed about a periphery of said interface means.

8. A valve assembly as recited in claim 1, wherein said impedance means includes wall means defining a cylindrical cavity, and wherein said interface means is at least partially disposed in said cylindrical cavity.

9. A valve assembly as recited in claim 8, wherein said wall means comprises a plurality of plates.

10. A valve assembly as recited in claim 1, wherein said rotary closure element comprises a ball valve closure element.

11. A valve assembly comprising:
   (a) a rotary closure element; and
   (b) an impedance assembly disposed downstream of said rotary closure element, said impedance assembly including:

(i) impedance means defining a plurality of passageways
(ii) interface means between said rotary closure element and said impedance means defining a plurality of passageways, said interface means for varying access to said plurality of passageways based upon positioning of said rotary closure element such that a number of passageways through which flow passes progressively increases during opening of said rotary closure element;

wherein said impedance means includes peripheral wall means, and wherein said plurality of passageways extend through said peripheral wall means, and further wherein said interface means is at least partially disposed inside of said peripheral wall means;

said peripheral wall means includes a length extending in a first direction, and wherein said plurality of passageways are distributed along said first direction and about a peripheral direction;

said interface means includes means for causing the number of passageways in said first direction through which fluid flows to increase as said rotary closure element is opened;

said interface means includes a plurality of channels each having an inlet adjacent to said rotary closure element, and wherein each of said plurality of channels includes an outlets said outlets disposed at different locations along said first direction;

wherein said interface means comprises a plurality of nested tubular members having different lengths; and wherein said interface means further includes a plurality of end plates spaced in said first direction, each of said plurality of end plates associated with one of said plurality of channels.

12. A valve assembly as recited in claim 11, wherein said plurality of end plates comprise a plurality of annular disks, each annular disk of said plurality of annular disks having an opening disposed about one of said plurality of tubular members.

13. A valve assembly as recited in claim 12, wherein at least one of said plurality of channels includes an outlet at a downstream end which allows fluid to exit without passing through passageways of said impedance means.

14. A valve assembly comprising:
(a) a rotary closure element; and
(b) an impedance assembly disposed downstream of said rotary closure element, said impedance assembly including:
    (i) impedance means defining a plurality of passageways;
    (ii) interface means between said rotary closure element and said impedance means defining a plurality of passageways, said interface means for varying access to said plurality of passageways based upon positioning of said rotary closure element such that a number of passageways through which flow passes progressively increases during opening of said rotary closure element;

wherein said impedance means includes wall means defining a cylindrical cavity, and wherein said interface means is at least partially disposed in said cylindrical cavity;

wherein said cylindrical cavity includes an upstream end adjacent said rotary closure element and a downstream end, and wherein a cover plate is mounted at said downstream end; and wherein said cover plate includes a plurality of perforations.

15. A valve assembly as recited in claim 14, wherein said interface means comprises a plurality of channels each having an inlet adjacent to said rotary closure element, each of said plurality of channels further including an outlet, and wherein each of the outlets of said plurality of channels are disposed at one of: (1) a different peripheral location about said cylindrical cavity, and (2) a different axial location along said cylindrical cavity.

16. A valve assembly as recited in claim 15, wherein said cover plate closes an axial end of at least some of said plurality of channels.

17. A valve assembly comprising:
(a) a rotary closure element; and
(b) an impedance assembly disposed downstream of said rotary closure element, said impedance assembly including:
    (i) impedance means defining a plurality of passageways;
    (ii) interface means between said rotary closure element and said impedance means defining a plurality of passageways, said interface means for varying access to said plurality of passageways based upon positioning of said rotary closure element such that a number of passageways through which flow passes progressively increases during opening of said rotary closure element;

wherein said impedance means includes wall means defining a cylindrical cavity, and wherein said interface means is at least partially disposed in said cylindrical cavity;

wherein said cylindrical cavity includes an upstream end adjacent said rotary closure element and a downstream end, and wherein a cover plate is mounted at said downstream end;

wherein said interface means comprises a plurality of channels each having an inlet adjacent to said rotary closure element, each of said plurality of channels further including an outlet, and wherein each of the outlets of said plurality of channels are disposed at one of: (1) a different peripheral location about said cylindrical cavity, and (2) a different axial location along said cylindrical cavity; and wherein said cover plate closes an axial end of some of said plurality of channels, and wherein said cover plate includes an opening such that at least one of said plurality of channels has an open axial end.

18. A valve assembly comprising:
(a) a rotary closure element;
(b) impedance means disposed downstream of said rotary closure element, said impedance means including wall means and a plurality of passageways extending through said wall means;
(c) interface means providing an interface between said rotary closure element and said impedance means, said interface means having a plurality of channels collectively communicating with said plurality of passageways, said interface means disposed with respect to said rotary closure element such that a number of said channels through which fluid flows increases as said rotary closure element is moved from a closed position to an open position, and wherein said channels each include a downstreammost end to thereby provide a plurality of downstreammost ends, with said plurality of downstreammost ends disposed at spaced positions with respect to one another and which are spaced in at least one of a circumferential direction and a longitudinal direction, such that as the rotary closure element is progressively opened a number of said passageways which is exposed to a fluid flow progressively increases, and wherein with respect to a flow axis direction corresponding to a direction of flow on an inlet side of said valve when said rotary closure element is fully opened, said spacing in said circumferential direction corresponds to a spacing circumferentially about said flow axis and said longitudinal direction corresponds to a direction parallel to said flow axis.

19. A valve assembly as recited in claim 18, wherein said interface means are disposed within a cylindrical cavity defined by said wall means.

20. A valve assembly as recited in claim 19, wherein said rotary closure element is a ball closure element.

21. A valve assembly as recited in claim 20, wherein said interface means includes a concave portion adjacent to said ball closure element.

22. A valve assembly as recited in claim 18, wherein said plurality of channels have different lengths with respect to said longitudinal direction when said valve is in the fully opened position.

23. A valve assembly as recited in claim 18, further including at least one direct flow passageway through which fluid flows without passing through said impedance means when said rotary closure element is in a fully opened position.

24. A valve assembly comprising:
  (a) a rotary closure element; and
  (b) an impedance assembly disposed downstream of said rotary closure element, said impedance assembly including:
    (i) impedance means defining a plurality of passageways;
    (ii) interface means between said rotary closure element and said impedance means defining a plurality of passageways, said interface means for varying access to said plurality of passageways based upon positioning of said rotary closure element such that a number of passageways through which flow passes progressively increases during opening of said rotary closure element;
  wherein said interface means comprises a plurality of nested tubular members having different lengths.

25. A valve assembly comprising:
  (a) a rotary closure element;
  (b) an impedance portion having a plurality of apertures for attenuating a flow of fluid passing through said valve assembly;
  (c) an interface assembly including a plurality of channels, wherein said interface assembly is disposed with respect to said rotary closure element such that a number of said channels through which fluid passes increases as said rotary closure element is moved from a closed position to an open position;
  wherein:
  (d) said plurality of channels each have downstream ends collectively communicating with said plurality of apertures such that a number of apertures through which the fluid passes increases as the number of said plurality of channels through which fluid flows increases, and wherein said channels of said interface assembly have different lengths with respect to a direction parallel to a flow axis direction on an inlet side of said valve assembly when the rotary closure element is in a fully opened position.

26. A valve assembly as recited in claim 25, further including at least one direct flow passageway through which fluid flows without passing through said impedance portion when said rotary closure element is in a fully opened position.

* * * * *